No. 771,437. PATENTED OCT. 4, 1904.
W. P. McCOBB.
LAND ROLLER.
APPLICATION FILED MAY 13, 1904.
NO MODEL.

Witnesses.
C. H. Garnett
J. Murphy.

Inventor.
William P. McCobb
by Jas. H. Churchill
atty.

No. 771,437.

Patented October 4, 1904.

UNITED STATES PATENT OFFICE.

WILLIAM P. McCOBB, OF DORCHESTER, MASSACHUSETTS, ASSIGNOR OF ONE-FOURTH TO JOHN WHITTAKER, OF DORCHESTER, MASSACHUSETTS.

LAND-ROLLER.

SPECIFICATION forming part of Letters Patent No. 771,437, dated October 4, 1904.

Application filed May 13, 1904. Serial No. 207,796. (No model.)

*To all whom it may concern:*

Be it known that I, WILLIAM P. McCOBB, a citizen of the United States, residing in Dorchester, in the county of Suffolk and State of Massachusetts, have invented an Improvement in Land-Rollers, of which the following description, in connection with the accompanying drawings, is a specification, like letters on the drawings representing like parts.

This invention relates to a land-roller, and has for its object to provide a simple, inexpensive, and highly-efficient roller for the purpose specified.

In accordance with this invention the roller is provided with a plurality of annular chambers or pathways, in each of which is located a ball or sphere of a diameter substantially equal to the width of the annular chamber or pathway, whereby a maximum weight will be applied to the ground or surface being rolled at the point of contact with said surface of the periphery of the annular chambers. The side walls of the annular chambers serve to keep the balls in place without interfering with their revolution, thereby enabling the roller to be used on inclined surfaces to the same advantage as it is used on level surfaces. These and other features of this invention will be pointed out in the claims at the end of this specification.

Figure 1:
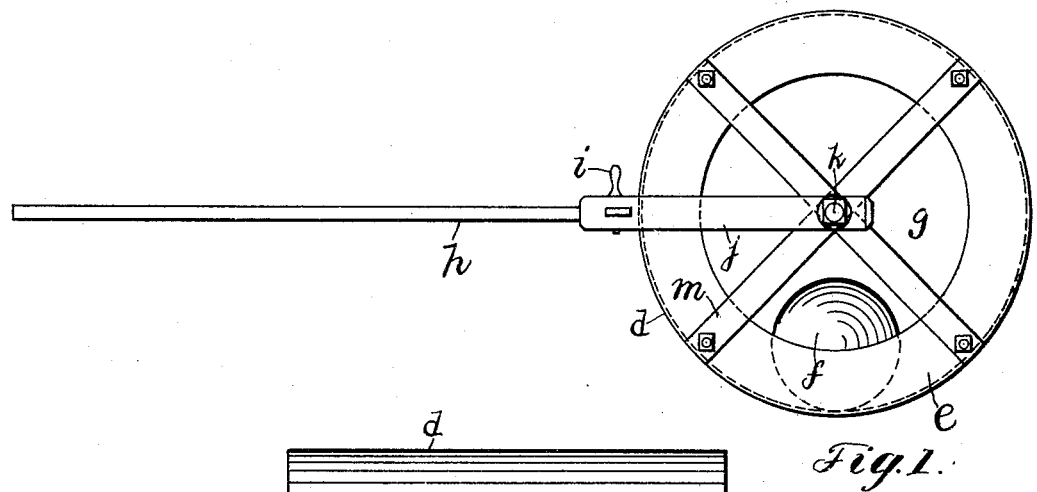
Figure 2:
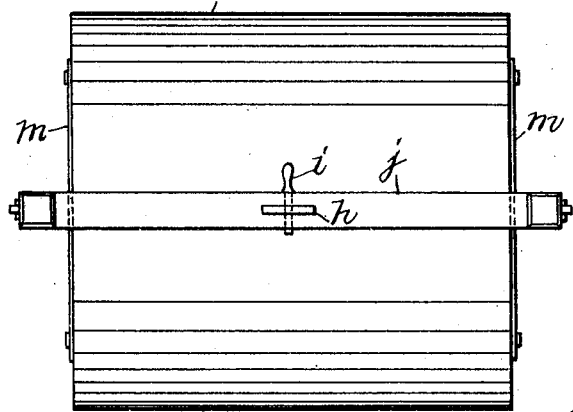
Figure 3:
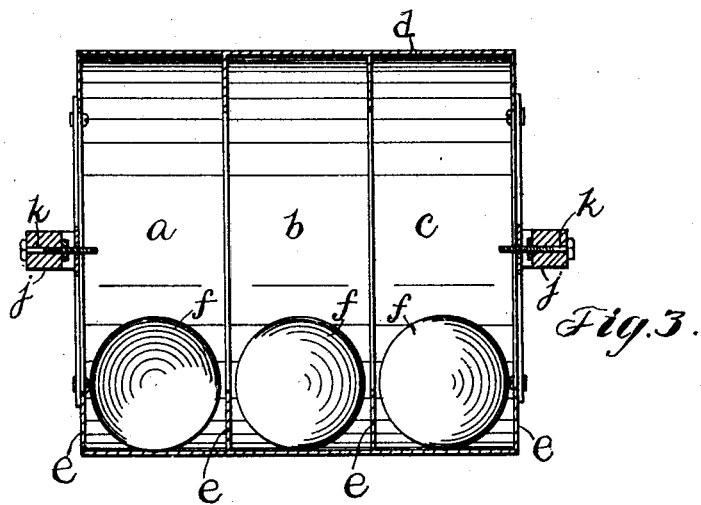

Figure 1 is a side elevation of a land-roller embodying this invention; Fig. 2, a front elevation of the roller shown in Fig. 1 looking toward the right, and Fig. 3 a vertical axial section of the roller shown in Fig. 1 with the balls in elevation.

In the land-roller herein shown as embodying this invention three annular chambers $a$, $b$, and $c$ are shown as formed within a cylinder $d$ by annular inwardly-projecting flanges $e$. The cylinder $d$ and the flanges $e$ may be made of sheet metal, such as steel, to cheapen the cost and reduce the weight of the roller.

The annular chambers $a$ $b$ $c$ in accordance with this invention contain balls or spheres $f$, each of a diameter substantially equal to the width of the chambers and which may be made of cast-iron, lead, or other heavy metal. Each ball $f$ is free to revolve in its own annular pathway or chamber and is restrained from extended movement in the direction of the axis of the roller by the flanges $e$, which form side walls for said annular chambers, thereby preventing the balls $f$ from running to one end of the roller when the latter is being used on an inclined surface. The inwardly-extended flanges also insure even distribution of the weight throughout the length of the roller, as the balls $f$ are confined in their annular chambers by said flanges, which do not interfere with the revolution of said balls. The flanges need only be made of a depth substantially equal to the radius of the balls, which is sufficient to keep the said balls in their chambers and which leaves a substantially large central opening $g$, through which the balls may be placed into and removed from their chambers when desired. The roller may be provided with a handle $h$, which may be pivotally attached to it in any suitable manner and is shown as detachably connected by a pin $i$ to a yoke $j$, which is connected by the pivots $k$ to cross-bars or arms $m$, attached to the end flanges of the cylinder.

In the present instance the annular chambers or pathways are shown as formed within a single cylinder $d$; but I do not desire to limit my invention in this respect. The flanges $e$ serve to strengthen the cylinder, and thereby enable said cylinder to be made of thin metal.

I claim—

1. In a land-roller, in combination, a revoluble cylinder provided with inwardly-extended annular flanges forming enlarged central openings and separated to form annular chambers, which communicate through said openings, and balls located in said annular chambers and of a diameter substantially equal to the width of said chambers, substantially as described.

2. In a land-roller, in combination, a plurality of concentric revoluble chambers, each having a circumferential wall and inwardly-extended annular flanges, and a ball located in each of said annular chambers and of a diameter substantially equal to the width of the chamber in which said ball is located, substantially as described.

In testimony whereof I have signed my name to this specification in the presence of two subscribing witnesses.

WILLIAM P. McCOBB.

Witnesses:
JAS. H. CHURCHILL,
J. MURPHY.